Figure 1:
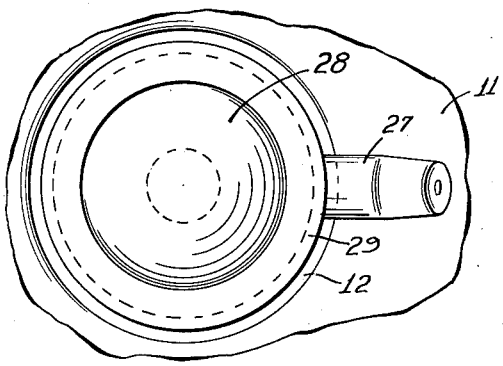

Jan. 3, 1956  A. O. SAMUELS  2,729,367
PRESSURE DISPENSING VALVE ASSEMBLY
Filed May 13, 1950

INVENTOR
Abe O. Samuels
BY
ATTORNEYS

United States Patent Office 2,729,367
Patented Jan. 3, 1956

2,729,367

PRESSURE DISPENSING VALVE ASSEMBLY

Abe O. Samuels, Bridgeport, Conn., assignor, by mesne assignments, to Maryland Devices, Inc., Baltimore, Md., a corporation of Maryland Application May 13, 1950, Serial No. 161,835

1 Claim. (Cl. 222—394)

This invention relates to discharge valves for self-dispensing pressure-tight containers, and more particularly is concerned with improvements in such valves whereby leakage around the valves and around the valve actuating parts thereof is, for all practical purposes, wholly eliminated. Additionally, the invention is concerned with simplifying the structure of valves currently used whereby the cost of such valves may be considerably reduced.

One of the heretofore most widely accepted types of discharge valves for pressure-tight containers comprises a valve body having a lower portion of reduced diameter adapted to enter an opening in one end wall of a pressure-tight container and having a depending flange also entering the opening in the container and adapted to be bent back to engage the underface of the container wall to secure the valve in place upon the container. A discharge passage extends centrally through the valve body and contains a valve which is spring urged against a valve seat to normally maintain the passage closed. A valve actuator or button extends into the discharge end of the passage by which the valve therein may be unseated to permit flow through the passage. A flexible diaphragm is disposed across the upper face of the valve body so as to overlie the outer end of the valve actuator and is maintained there by a retaining member either threaded onto the valve body or clipped thereto. A hole is formed through the wall of the valve body placing the area beneath the diaphragm in communication with the interior of the diaphragm retaining member. The retaining member in turn contains an orifice through which material passing through the valve is finally discharged.

I have found that despite the use of a sealing compound around the edge of the opening in the container end wall, leakage frequently occurs between the container wall and the valve body. With a view to remedying this defect, my invention contemplates the provision of an annular channel in the shoulder of the valve body which rests upon that portion of the container wall surrounding the opening and a gasket which may be mounted or contained in the channel when the valve is mounted in the container opening and which is compressed by the bending back of the retaining flange to effectively prevent leakage around the valve body.

Another objection that I have to the accepted type of discharged valve now widely used and described above is the requirement for a separate retaining member by which to secure the diaphragm upon the valve. The requirement, with such a valve, that material leaving the container pass from the valve body into the retaining member and thence through the orifice therein, results in considerable clogging. This is most undesirable and should therefore be avoided. Additionally, in an article of manufacture which must necessarily be very inexpensive, multiple parts should be avoided wherever possible. My invention therefore contemplates dispensing with the separate retaining member and instead, providing a discharge nozzle mounted in the wall of the valve body to place the area under the diaphragm directly in communication with the outer atmosphere and forming an upwardly extending peripheral flange on the top of the valve body which may be bent inwardly over the peripheral edge of the diaphragm to effectively secure it to the valve body as well as to provide an effective seal between it and the valve body. The latter, as well as being a considerably less expensive way in which to retain the diaphragm on the valve body, results in the sealing of the diaphragm to the valve body in a manner superior to that found in many valves in which a separate retaining member is used.

Figure 2:
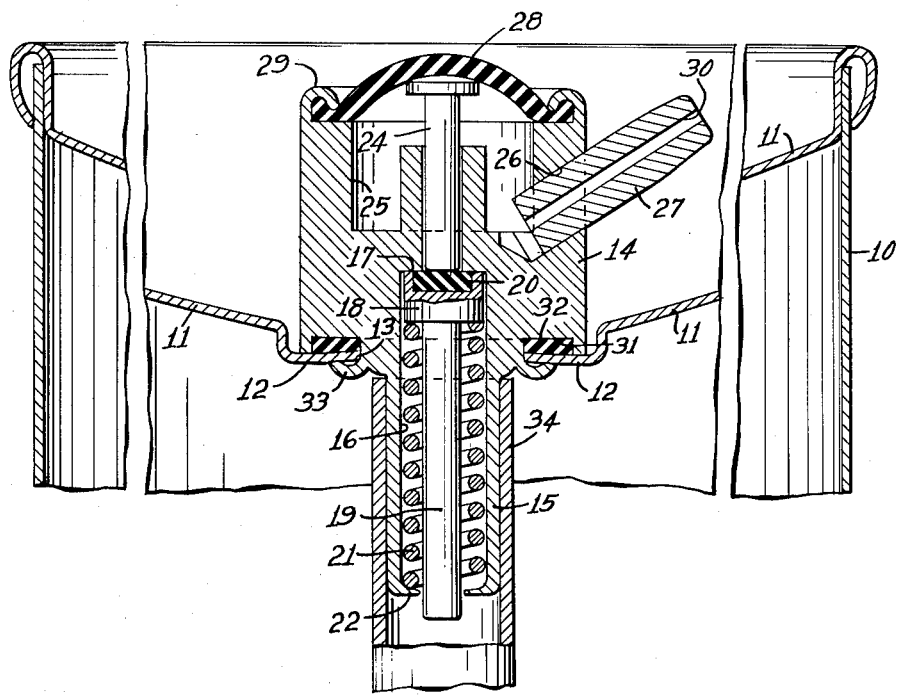
Figure 3:
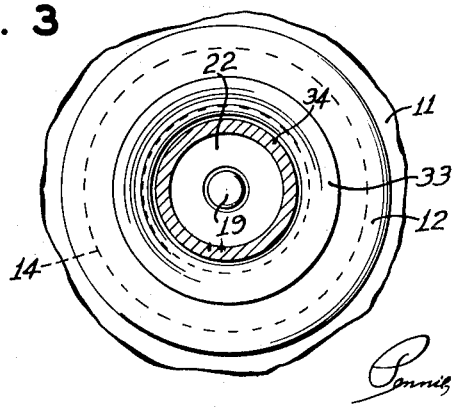

For a better understanding of my invention, reference may be made to the accompanying drawing in which one form of valve, according to my invention, is illustrated and in which:

Fig. 1 is an elevational view, in section, of the valve mounted in the top wall of a pressure-tight container, only a portion of the container being shown, Fig. 2 is a top plan view of the valve and part of the container top, and, Fig. 3 is a bottom plan view of the valve and part of the container top taken from within the container.

The pressure-tight container shown in the drawing, and most clearly in Fig. 1 thereof, is of cylindrical form having a side wall 10 to which is hermetically sealed a concave upper end wall 11. A portion 12 at the center of end wall 11 is flattened and an opening 13 is formed centrally through the flattened portion. This opening is adapted to receive the improved valve of my invention.

The improved valve comprises a valve body having an upper portion 14 of substantially larger cross-sectional area than the opening 13 in the end wall of the container and a lower portion 15 of a cross-sectional area somewhat smaller than the opening 13. A passage 16 extends longitudinally through the valve body and is of reduced diameter at its upper or discharge end, a valve seat 17 being thereby formed intermediate the ends of the passage.

A valve 18 is supported on a valve stem 19 within the lower portion of the passage and carries a gasket 20 on its upper face which is adapted to engage the valve seat to effectively close the passage. A spring 21 surrounds valve stem 19 engaging, at its upper end, the rear face of the valve and, at its lower end, flange 22 turned or bent inwardly from the lower portion of the valve body 15. Thus, the valve is normally spring urged towards closed position. It will be noted that the valve is somewhat smaller in diameter than the lower portion of passage 16 through the valve body and that the inturned flange 22 is spaced slightly from the valve stem whereby a fluid under pressure within the container may pass through the lower portion of passage 16 when the valve is unseated.

A valve actuator or button 24 is mounted in the upper smaller portion of passage 16, its lower end engaging the upper face of the valve and adapted when the valve actuator is depressed to unseat the valve. As was the case with the valve, valve actuator 24 is of a somewhat smaller diameter than the upper smaller portion of passage 16 whereby fluid from the container, which passes the valve when the valve is unseated, may pass through the upper end of the passage.

A spaced annular channel 25 is provided in the upper larger portion 14 of the valve body around the discharge end of the passage 16 for a purpose that will be subsequently set forth. A passage 26 places the annular channel in communication with the outer atmosphere through the wall of the valve body surrounding the channel and contains a nozzle 27, press-fitted thereinto, through which fluid discharge through the valve body may be discharged to the atmosphere.

A flexible diaphragm 28 overlies the upper face of the valve body, the annular channel 25 therein and the upper end of valve actuator 24. The flexible diaphragm is secured in place by an upwardly-extending peripheral flange 29 integral with the valve body and bent inwardly over the peripheral edge of the diaphragm. The diaphragm and the spaced annular channel 25 serve to define an expansion chamber for fluid passing through the central passage of the valve so that the fluid, which is under pressure, may expand and be atomized for discharge through nozzle 27. For this purpose it will be apparent that the net cross-sectional area of the unobstructed portion of the passage 16 when the valve is open must be less than the cross-sectional area of discharge passage 30 in the nozzle. The diaphragm, of course, also serves to maintain the valve actuator or button 24 in place in the discharge end of passage 16.

An annular channel 31 is formed in the face of the shoulder of the valve body between the upper and lower portions thereof and caintains a gasket 32 composed of resilient material and slightly thicker than the channel is deep. A flange 33 integral with the valve body extends downwardly from the shoulder around lower portion 15 of the valve body and through opening 13 in the container end wall. Flange 33 is bent outwardly and upwardly to engage the inner face of that portion of the container wall surrounding opening 13. The bent back flange serves to compress gasket 32 between channel 31 and the container end wall and between the outer and inner walls of channel 31 to form an effective seal for preventing the escape of fluid from within the container around the valve body. The outer wall of the annular channel 31 prevents the gasket 32 from slipping, becoming deformed or expanding laterally as pressure is exerted on flange 33 in the sealing operation.

A siphon tube 34 has its upper end secured about lower portion 15 of the valve body, its lower end extending downwardly to the bottom (not shown) of the container so that all of the container contents will be discharged.

For operation of the valve to permit the discharge of fluid under pressure from within the container, the user's finger need only engage the flexible diaphragm 28, and by depressing it, open the discharge valve.

As will now be apparent, the improved construction employed in my discharge valve, namely, the provision of channel 31 and the therein contained gasket 32 will effectively prevent the leakage of fluid from the container about the valve body. By the provision of integral flange 29 the flexible diaphragm is easily secured across the upper face of the discharge valve and is effectively sealed around its peripheral edge so that fluid may not escape from beneath the diaphragm other than through the discharge passage 30 of nozzle 27. The flange 29 is positioned, as an integral part of valve body 14, above flange 33 and channel 31, also integral parts of valve body 14, so that if desirable the sealing operation performed by both flanges may be accomplished simultaneously by the exertion of opposing forces. It will be noted that my improved discharge valve is capable of being simply and inexpensively constructed, the valve body being adapted to be stamped out in one piece with suitable dies, and the valve and the valve actuating member being easily insertable as is also the unitary nozzle 27.

I claim:

The combination of a pressure-tight container having an opening in one end thereof, a discharge valve mounted in the opening and having a shoulder overlying the outer face of the end wall around the opening and an annular flange integral with and depending from the shoulder, said flange extending through the opening and being bent back to engage annularly the inner face of the wall around the opening to secure the discharge valve to the container, the shoulder of the discharge valve having an annular channel overlying that portion of the wall of the container around the opening above the bent back flange, and a gasket composed of resilient material in the annular channel compressed between the upper and outer and inner walls of the channel and said portion of the end wall of the container by the bent back flange to prevent leakage between the container wall and discharge valve, said gasket being slightly thicker than the depth of the annular channel and substantially as wide as is said channel.

References Cited in the file of this patent
UNITED STATES PATENTS

| | | |
|---|---|---|
| 2,023,397 | Blomgren | Dec. 10, 1935 |
| 2,301,271 | Gill | Nov. 10, 1942 |
| 2,305,286 | Ward | Dec. 15, 1942 |
| 2,317,755 | Gouch et al. | Apr. 27, 1943 |
| 2,322,183 | Ward | June 15, 1943 |
| 2,324,648 | Roeder | July 10, 1943 |
| 2,506,449 | Greenwood | May 2, 1950 |
| 2,574,036 | Henchert | Nov. 6, 1951 |
| 2,579,977 | Sjolin | Dec. 25, 1951 |